April 3, 1928.  R. A. CURRIE  1,665,055
BAIL ATTACHING MEANS FOR LANTERNS AND THE LIKE
Filed June 22, 1927
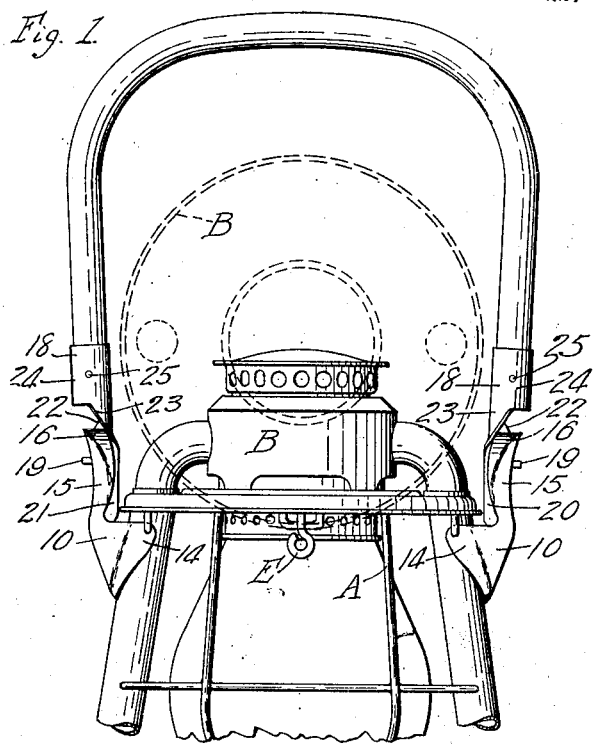
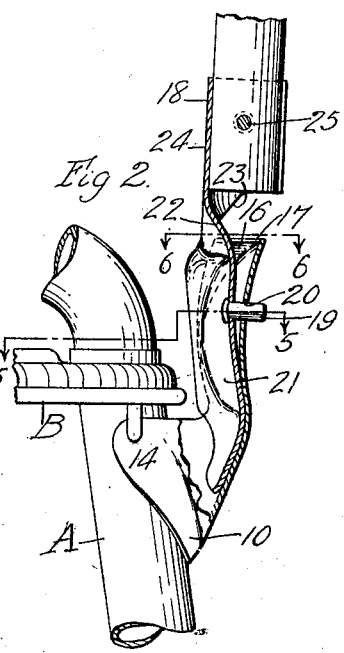
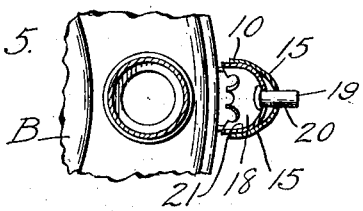
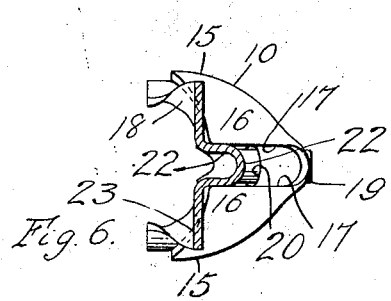
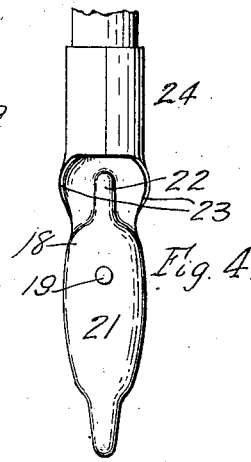
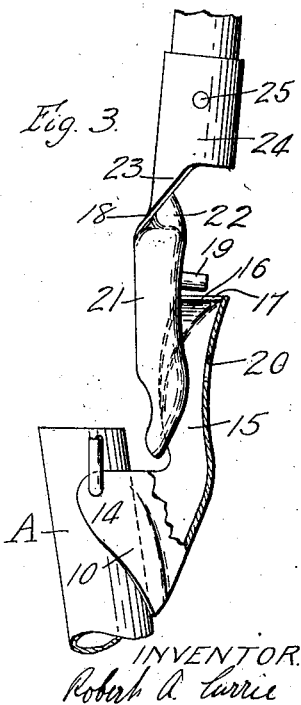
INVENTOR
Robert A. Currie
by Parker & Prochnow
ATTORNEYS Patented Apr. 3, 1928.

1,665,055

UNITED STATES PATENT OFFICE.

ROBERT A. CURRIE, OF SYRACUSE, NEW YORK, ASSIGNOR TO R. E. DIETZ COMPANY, OF NEW YORK, N. Y.

BAIL-ATTACHING MEANS FOR LANTERNS AND THE LIKE.

Application filed June 22, 1927. Serial No. 200,607.

My invention relates more particularly to improvements in bail connectors or fasteners for removably securing the carrying bails or handles on lanterns and holding the bail in upright position rigid with the lantern so that the lantern can be manipulated or moved to and held in any required position by means of the bail, as may be necessary, for example, for signalling purposes by railway train men. While my improvements are primarily designed for use in connection with lanterns, they are also applicable to pails and other portable articles on which bails are used. This invention is in the nature of improvements on the bail attaching means or connectors disclosed in my co-pending applications for United States patents, Serial No. 75,853, filed December 16, 1925 and Serial No. 142,270, filed October 18, 1926.

In the construction shown in said first mentioned application, the lantern is provided with bail ears which project upwardly from the lantern frame at opposite sides of the hinged top of the lantern and consist of sheet metal stampings of channel shape in cross section. The bail or handle is provided at the ends of its legs with sheet metal bail-ends or fittings which are formed to seat in the channels of the bail ears and are provided with outwardly projecting studs adapted to enter stud holes in the bail ears for detachably connecting the bail with the bail ears. The bail ends when thus secured are disposed relatively to the hinged lantern top so that when the top is fastened in its normal closed position, the edge of the top at opposite sides thereof will lie inside of and so close to the bail ends that the legs of the bail cannot be sprung inwardly far enough to disengage the bail ends from the bail ears. The bail is thus detachably secured to the lantern and is held in upright position by the interengagement or nesting of the bail-ends in the channel-shaped bail ears, and the bail cannot be disengaged from the bail ears without first unfastening and swinging the lantern top out of its closed position. Thus, the bail is prevented from accidental disengagement from the bail ears but can be readily detached by first opening the top.

One object of this invention is to make the bail ends or end pieces of a novel construction whereby their strength and rigidity is increased and a rigid connection of the bail with the lantern will be assured. Other objects of the invention are to form the bail ends so as to permit a detachable bail of the sort disclosed in said first mentioned application furnished with such bail-ends to be used on a lantern equipped with bail ears of the construction disclosed in said second named application; also to provide a complementary formation of the bail ears and the bail ends, whereby both the bail ears and the bail ends will be of sturdy and rigid construction and will hold the bail upright, rigid with the lantern frame, and will provide a very strong and rigid, detachable connection between the bail and the lantern which will not be bent or broken by the manipulation or movement of the lantern by means of the bail; and also to improve bail connectors or fasteners in the other respects hereinafter described and set forth in the claims.

In the accompanying drawings:

Fig. 1 is an elevation of the upper portion of a lantern provided with a detachable bail secured on the lantern by connectors or attaching means embodying my invention.

Fig. 2 is a fragmentary, sectional elevation on an enlarged scale, showing the bail connector or fastener at one side of the lantern.

Fig. 3 is a sectional elevation showing one of the bail-ends disconnected from the companion bail ear.

Fig. 4 is an outside elevation of the bail-end.

Fig. 5 is a sectional plan view on line 5—5, Fig. 2.

Fig. 6 is a sectional plan view on an enlarged scale on line 6—6, Fig. 2.

A represents the upper portion of the frame of a signal lantern, B the hinged top of the lantern and C the lantern bail or handle. Except with respect to the construction of the bail connector or attaching means, the lantern may be of known or any suitable construction. The top B, as usual, is hinged at one side to the top of the lantern frame to permit the top to swing upwardly from its horizontal, closed position shown in full lines, Fig. 1, to the raised position shown by broken lines in the same figure. E represents the usual catch at the front of the top for releasably securing the top in its closed position.

10 represents the bail ears which, as usual, are fixed to the upper portion of the lantern frame and project upwardly at opposite sides of the lantern top B. The lantern frame shown is provided with side air tubes to which the bail ears may be rigidly secured in any suitable manner, for instance, as disclosed in said applications.

The bail ears are preferably constructed substantially as disclosed in my above-mentioned application No. 142,270. Each of the ears consists of a sheet metal stamping or single piece of sheet metal suitably formed into the shape shown. The ear is channel or trough-shape in cross section, the lower portions of the side flanges of the ear being extended to form attaching wings 14 which are curved to straddle and fit against the surface of the tube on which they are secured. The portion of the bail ear which projects upwardly from the lantern frame has relatively wide, inwardly extending side flanges 15 which make the ear strong and rigid. At their upper portions, the side flanges are bent laterally toward each other, as shown at 16 in Figs. 2, 3 and 6, so as to provide transversely extending bail-engaging parts or edges 17 at the upper end of the bail ear. These edges 17 are spaced apart and extend substantially parallel with each other and with a vertical plane passing centrally through the bail ears at opposite sides of the lantern. This formation further strengthens and stiffens the ear.

The bail, as usual, is of substantially U-shape and may be formed of a bent rod or tube of wood, metal or other material. It preferably has separate sheet metal end fittings or bail ends 18 suitably secured to the lower ends of its legs and provided with outwardly projecting studs 19 adapted to enter the stud holes 20 in the bail ears for detachably securing the bail to the bail ears. The body portion 21 of each bail-end from which the stud 19 projects is of channel shape cross section and adapted to nest or seat within the channel of the companion bail ear between the side flanges 15 thereof and bear against the bottom of the channel or groove in the ear. The lower extremity of the bail end 18 also preferably extends down in the bail ear between the securing wings 14 of the ear so that said lower extremity will be held within the ear and prevented from lateral movement relatively to the ear. The portion of the bail above the stud 19 is formed with an integral rib or portion adapted to enter between the inbent upper flange edges 17 of the bail ear. Preferably the sides of this upper portion of the bail-end are pressed toward each other so as to form a narrow, vertical rib or projection 22 at the outer side of the bail end, and the side flanges are bent reversely or outwardly at 23, and these outbent, side portions are preferably extended and bent to form a tubular or sleeve portion 24 adapted to encircle and be secured on the end of the bail leg in any suitable manner, as for instance by a cross pin 25 passing through the sleeve and leg.

By this formation of the bail-end the same is made very strong or stiff and the portion thereof where the side flanges are reversed or bent outwardly is strengthened by the rib 22 which extends vertically from the upper end of the broad channelled body portion 21 of the bail-end to the base portion of the sleeve 24, thus acting as a brace to prevent the end piece from bending between the sleeve and the body portion 21. The bail end piece is very stiff and rigid throughout and not apt to bend or break between the portion which engages the bail ear and the sleeve portion which is secured to the bail. It will be noted further that by the described formation of the bail-end and bail ear, the rib 22 of the bail end is adapted to enter between the substantially parallel flange edges 17 at the upper end of the ear. Thus the bail-end engages between opposite side portions of the bail ear both below and above the stud, and the bail-end is therefore engaged and held by the ear at three points, that is at the stud and at points below and above the stud. This insures a very firm, rigid engagement between the bail and the bail ear, which holds the bail rigid with respect to the lantern frame and prevents relative movement between these parts in the handling and manipulation of the lantern by means of the bail. The bail can be readily engaged with the bail ears by springing the lower ends of the bail toward each other and slipping the bail-ends down into the channel-shaped bail ears, and then permitting the ends of the bail to spring outwardly, thereby engaging the studs in the stud holes of the bail ears. To do this, the lantern top must be in its upper or open position. When the top is closed and secured by its catch, the opposite edges of the top will lie so close to the bail ends that the latter cannot be sprung inwardly far enough to disengage the studs 19 from the stud holes of the ears. The bail, therefore, cannot be detached from the lantern except by first opening the top.

The bail ends formed as described adapt a bail of the type disclosed in my first above-mentioned application to be used on a lantern equipped with bail ears of the form disclosed in my second mentioned application Serial No. 142,270.

I claim as my invention:

1. The combination with an article having a bail ear provided with upwardly projecting channel-shaped portions and having inbent portions with spaced transversely extending parts at the upper end of the ear, of a bail having a metal bail end formed to seat in the channel of the companion bail ear, a stud on one of said members entering a hole in the other member, said bail end having a part formed to nest in and be held from lateral movement in the channel of the bail ear below the stud, and having an integral portion above the stud formed to enter between and engage said spaced transverse parts at the upper end of the bail ear.

2. The combination with an article having opposite bail ears provided with upwardly projecting channel-shaped portions having stud holes therein, of a bail having sheet metal bail ends provided with studs adapted to enter said stud holes, each bail ear having inbent portions with spaced transversely extending parts at the upper end of the ear, and the companion bail end having a lower portion formed to nest in and be held from lateral movement in the channel of the bail ear below the stud and having an integral portion above the stud formed to enter between and engage said spaced transverse parts at the upper end of the bail ear.

3. The combination with an article having opposite bail ears provided with upwardly projecting channel-shaped portions having stud holes therein, of a bail having sheet metal bail ends provided with studs adapted to enter said stud holes, each bail ear having inbent portions with spaced transversely extending parts at the upper end of the ear, and the companion bail end having a lower portion formed to nest in and be held from lateral movement in the channel of the bail ear below the stud and having above the stud an integral central projection at its outer side adapted to enter between and engage said transverse parts at the upper end of the bail ear.

4. The combination with an article having opposite bail ears provided with upwardly projecting channel-shaped portions having stud holes therein and having the side flanges thereof bent inwardly above said stud holes and formed with spaced transversely extending upper edges, of a bail having sheet metal bail ends formed to seat in said channel-shaped bail ears and provided with studs adapted to enter said stud holes, each bail end being formed above the stud with a narrow integral rib at its outer side adapted to enter between and engage the transversely extending upper flange edges of the bail ear.

5. A sheet metal bail end having a body portion of channel-shaped cross section provided with inwardly extending side flanges and with an upper portion having outwardly extending side flanges, and a rib at the outer side of said bail end extending from the portion of the bail ear having the inwardly extending flanges to the portion thereof having the outwardly extending flanges.

6. A sheet metal bail end having a body portion of channel-shaped cross section provided with inwardly extending side flanges and with an upper portion of channel-shaped cross section having outwardly extending side flanges, and a narrow rib joining said body portion and said upper portion and forming a brace for stiffening the adjacent portion of the bail end.

7. A sheet metal bail end having a body portion of channel-shaped cross section provided with inwardly extending side flanges and with an upper portion of channel-shaped cross section having outwardly extending side flanges, said flanges of said upper portion being extended and forming a tubular sleeve for attachment to a bail, and an integral bracing projection formed on the outer side of said bail end and extending from said body portion to the upper portion having the outwardly extending side flanges.

ROBERT A. CURRIE.